Sept. 22, 1964  D. WOLF  3,149,801
AIR DUCT AND VALVE SYSTEM FOR AIRCRAFT
Filed Dec. 18, 1963  3 Sheets-Sheet 1
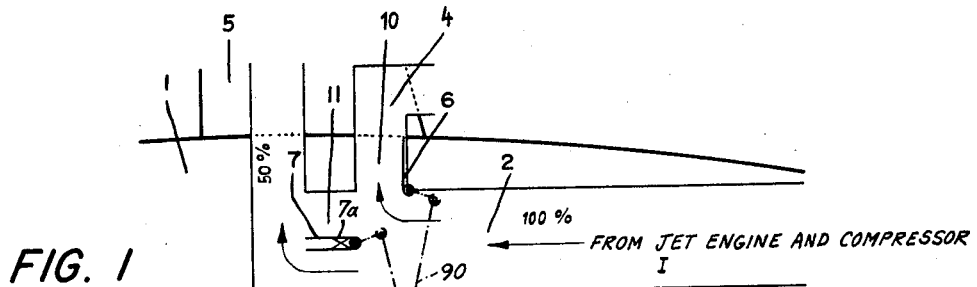
FIG. 1
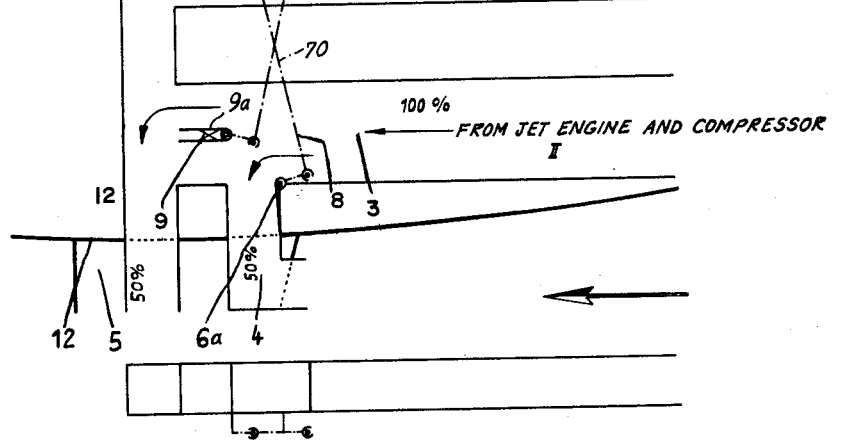
FIG. 2
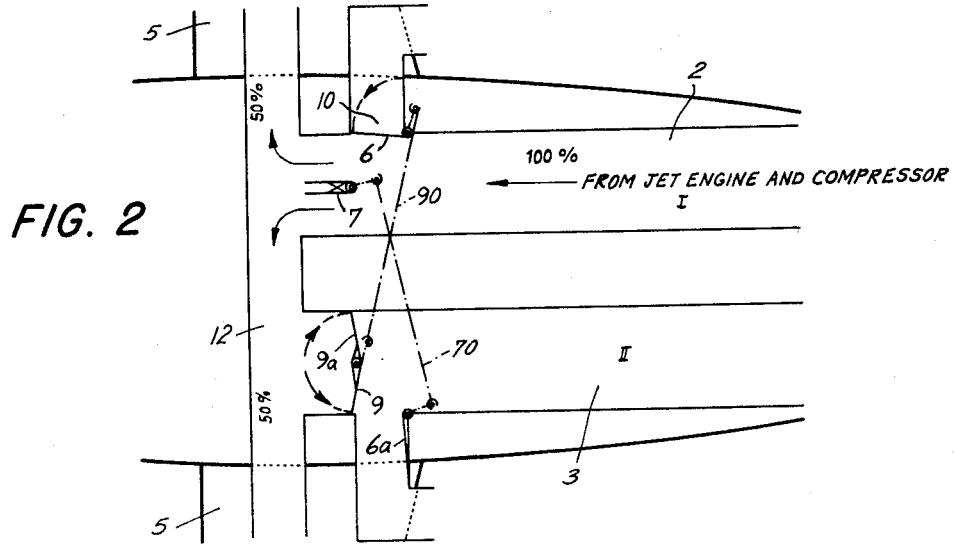
INVENTOR.
Dietmar Wolf
BY
Michael J. Striker

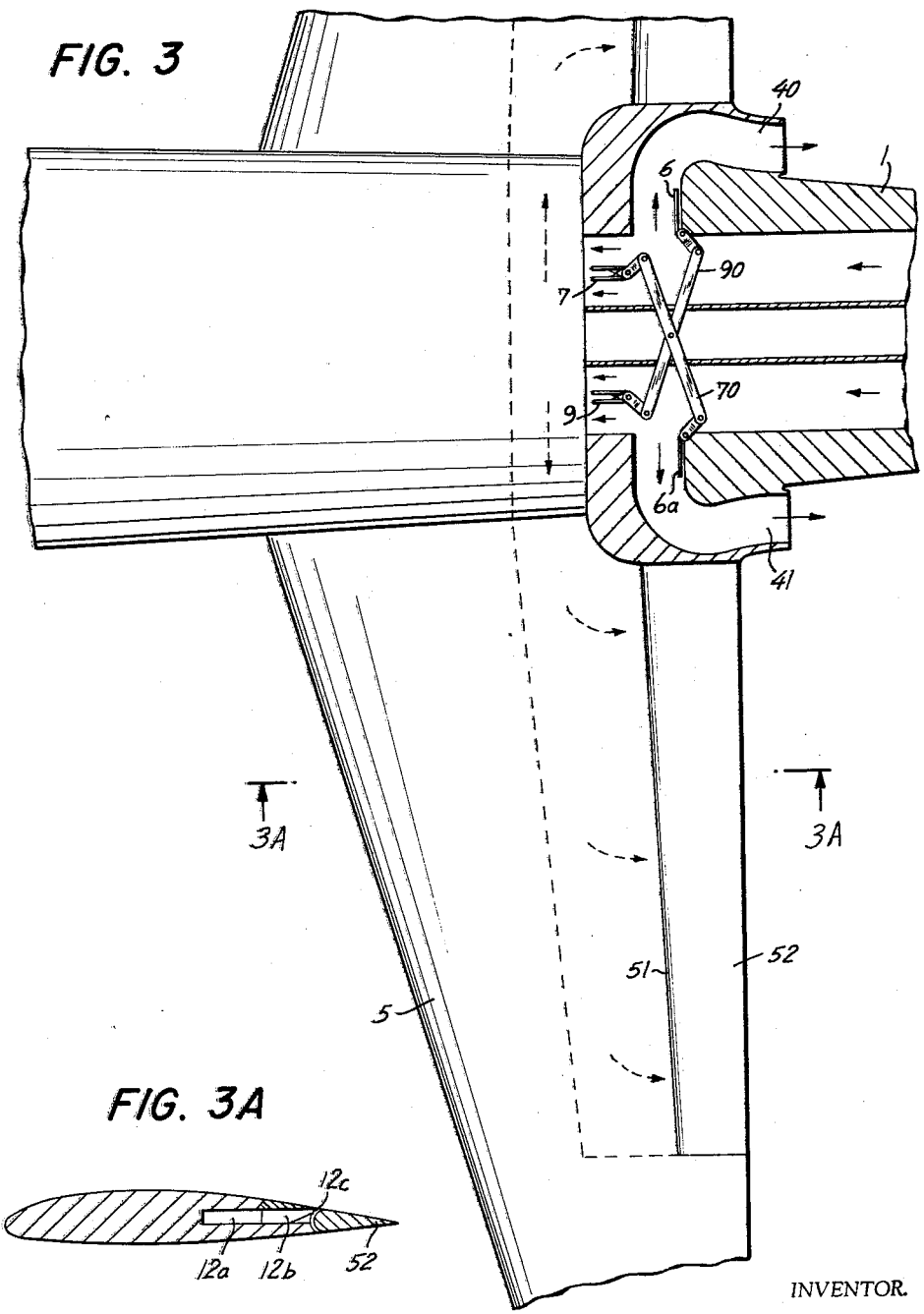

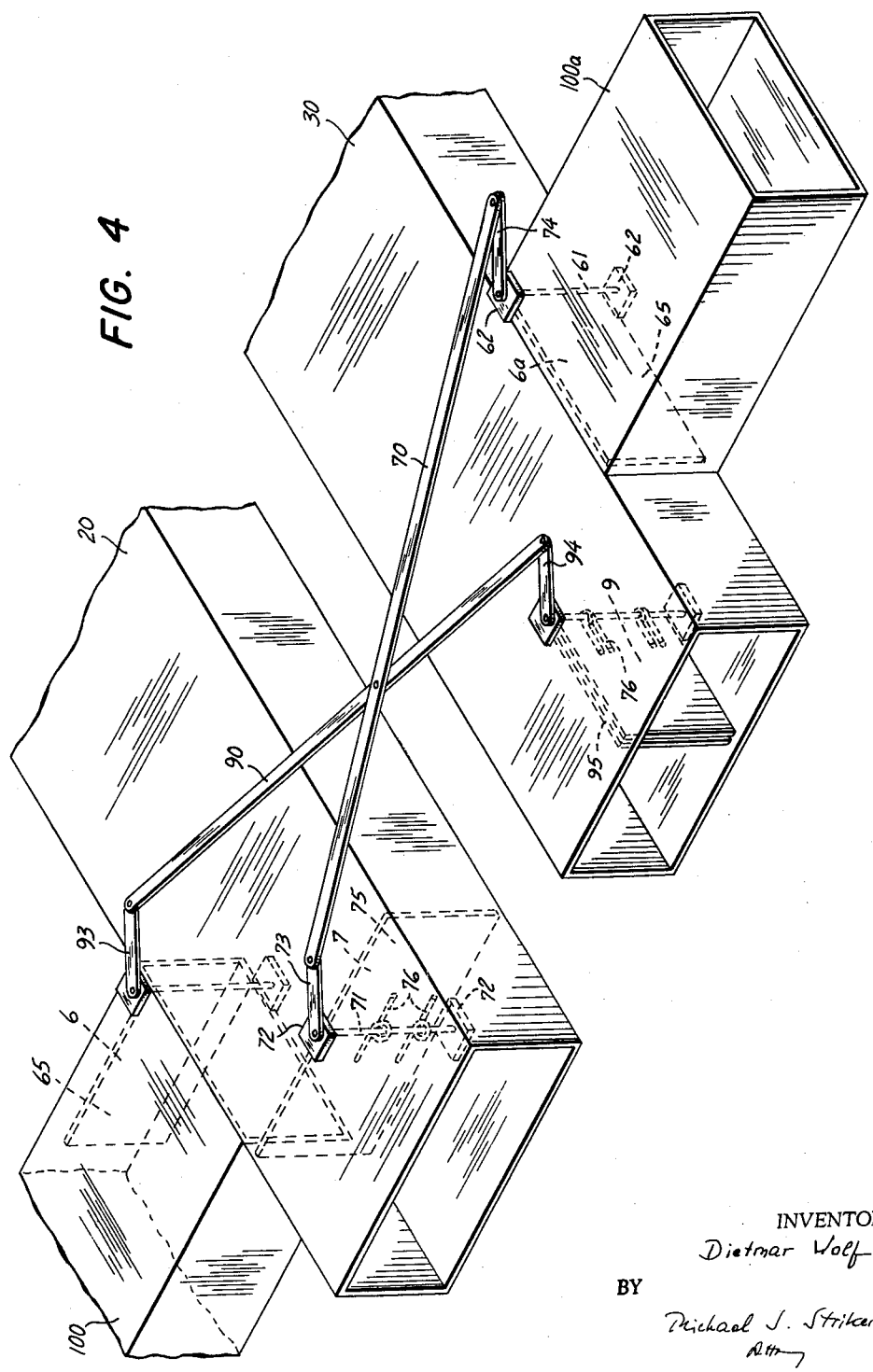

United States Patent Office 3,149,801
Patented Sept. 22, 1964

3,149,801
AIR DUCT AND VALVE SYSTEM FOR AIRCRAFT
Dietmar Wolf, Munich, Germany, assignor to
Messerschmitt A.G., Augsburg, Germany
Filed Dec. 18, 1963, Ser. No. 331,629
Claims priority, application Germany, Dec. 20, 1962,
M 55,207
18 Claims. (Cl. 244—15)

The present invention relates to an air duct and valve system for an aircraft, and more particularly to an automatic valve system for controlling the flow of air through an air duct system in such a manner that upon engine failure, a stable condition of the aircraft is maintained, and the same can be safely operated.

It is known to provide compressor means driven from the jet engines of an aircraft for blowing air out of nozzles in the wings for the purpose of producing a greater lifting force. However, only a part of the secondary cold air is conducted to the wings, while another part of the compressed air is blown out of rearwardly directed nozzles provided on the sides of the fuselage. The arrangements according to the known art serving this purpose have the disadvantage that in the event of failure of one jet engine or of the compressor driven by the same, compressed air is blown out only from one of the wings so that unsymmetrical propulsion forces act on the aircraft.

It is one object of the present invention to overcome this disadvantage of prior art constructions, and to provide an air duct system provided with valves which are operated to maintain the supply of compressed air to both wings of the aircraft, even if one of the jet engines or the corresponding compressor fails.

Another object of the invention is to provide an automatically operating valve system which will automatically cause supply of air from one compressor to both wings if the respective other compressor, or the jet engine driving the same fail.

Another object of the present invention is to provide a valve system in the air ducts of an aircraft which automatically effects the closing of lateral nozzles in the air duct in which an operating compressor produces compressed air, so that the entire compressed air is available for distribution to both wings when the respective other compressor fails.

It is also an object of the present invention to maintain the amount of air blown out from outlet means in the wings even if one of two compressors fails.

With these objects in view, the present invention relates to an air duct and valve system for an aircraft having a pair of jet engines and a pair of compressors driven by the same. According to one embodiment the system comprises, first and second main ducts extending in longitudinal direction of the aircraft for guiding two forward streams of air toward a forward section of the aircraft; a transverse duct connecting the main ducts and having outlet means, preferably located in the wings of the aircraft, for discharging air; discharge ducts connected to the main ducts for discharging air so that the remaining air of the air stream is discharged from the aircraft through the transverse duct and the outlet means during normal operation of the aircraft; first and second control valve means located in the main ducts and being operable independently of each other between normal open positions and duct closing position; closure valve means located in the discharge ducts and being operable between a normal open position and a duct closing position; and operating means, preferably including a mechanical linkage, for moving either the first or the second control valve means and the closure valve means to the duct closing positions when one of the air streams in one of the main ducts ceases.

When a closure valve closes the respective discharge duct, the entire air stream flows into the transverse duct and is discharged from the outlet means in both wings of the aircraft. The other control valve means is closed and prevents the flow of air from the transverse duct into the main duct in which there is no air pressure.

Compressors are driven by jet engines to produce the forward air streams in the two main ducts, and when one of the compressors fails, all the air pressure produced by the respective other compressor can be used for discharging air from both wings of the aircraft, whereas the discharge from lateral discharge nozzles is prevented by the closed closure valves.

In a preferred embodiment of the invention, each of the valves includes flaps, and particularly the control valves in the main ducts have spring-loaded flaps which are held by the pressure of the flowing air stream in a longitudinally extending position in which the main air duct is open. However, when the air stream in the main duct ceases, for example due to failure of the respective compressor, the force of the spring acting on the flap of the control valve is sufficient to move the flap to a position closing the respective main duct. The flap of each control valve is connected by a linkage to the flap of the respective other closure valve so that one discharge duct is automatically closed when the pressure in the respective other main duct is insufficient to maintain a control valve flap in open position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 in a fragmentary schematic plan view illustrating an embodiment of the invention in normal operating position;

FIG. 2 is a fragmentary schematic plan view illustrating the embodiment of FIG. 1 in another operational position required during an emergency when one of the jet engines or compressors has failed;

FIG. 3 is a fragmentary plan view, partially in section, illustrating the apparatus in normal operative position;

FIG. 3a is a cross sectional view on line 3a—3a in FIG. 3; and

FIG. 4 is a schematic perspective view illustrating the air ducts, valves, and linkages used in the embodiment of FIG. 3.

Referring now to the drawings, and more particularly to FIG. 1, in the fuselage 1 of an aircraft, two longitudinally extending main ducts 2 and 3 are provided. Air stream flowing from the rear to the front are produced in air ducts 2 and 3 by two compressors, not shown, which are driven by two jet engines, not shown. This arrangement is known, and not an object of the present invention. Jet propulsion arrangements of this general type are disclosed in the U.S. Patents 2,912,189, 2,928,627, 2,451,008 and 1,887,148.

The forward ends of main ducts 2 and 3 communicate with a transverse duct 12 whose outermost portions extend into the wings 5 of the aircraft and are provided with outlet means for discharging air in a rearward direction from the wings for the purpose of increasing the lifting force of the wings.

Rearwardly of the transverse duct 12, two discharge ducts 10 are connected to main ducts 2 and 3 and terminate in rearwardly oriented nozzles 4 through which air is discharged. Nozzles 4 may be tiltable.

First and second control valves 7 and 9 are disposed in portions 11 of the main ducts between transverse duct 12 and discharge ducts 10. First and second closure valves 6 and 6a are located in the discharge ducts 10 and can be moved between the open position illustrated in FIG. 1 and a duct closing position illustrated for the upper control valve 6 in FIG. 2. Control valves 7 and 9 are movable between the normal open position illustrated in FIG. 1, and a duct closing position illustrated for the control valve 9 in FIG. 2. Linkage means 70 and 90 connect the first control valve 7 with the second control valve 6a, and the second control valve 9 with the first closure valve 6. The linkages are constructed in such a manner that closure valve 6a and control valve 7 will simultaneously close and open, and the same relationship exists between control valve 9 and closure valve 6.

During normal operations, each of the air streams moving forwardly in the direction of the arrows in the main ducts 2 and 3 is divided so that 50 percent of each air stream is discharged through the respective discharge duct 10, while the remaining 50 percent is discharged through the ends of transverse duct 12 and the outlets in the wings. Each control valve 7 and 9 includes a pair of flaps which are urged apart by springs 7a and 9a and tend to assume the duct closing spread position shown for control valve 9 in FIG. 2. As explained above, the closure valve 6 in the discharge duct leading to the respective other main duct is closed by the connecting linkage at the same time.

The pressure produced by the part of the air stream flowing through duct portion 11 during normal operation is sufficient to overcome the force of spring 7a or spring 9a and to turn the flaps to the position in which the respective main duct is open. However, when one of the air streams ceases in one of the main ducts 2 or 3, the force of the respective spring 7a or 9a is sufficient to turn the flaps of control valves 7 and 9 to the spread duct closing position. This condition will occur when one of the jet engines, or the compressor driven thereby, fails so that the compressor cannot produce the forward air stream in the respective main duct 2 or 3.

FIG. 2 illustrates the apparatus in a condition in which the compressor or jet engine in main duct 3 is inoperative, so that no air stream flows in duct 3. Since the pressure which normally acts on the flaps of control valve 9 has ceased, the spring 9a turns the flaps to the duct closing position, and linkage 90 turns simultaneously the flap of closure valve 6 to the duct closing position in which discharge duct 10 is closed.

Consequently, the entire air stream flowing through main conduit 2 acts on the valve flaps of valve 7 and 100 percent of the air stream flowing in main duct 2 enters the transverse duct 12. The air stream is divided in transverse duct 12 so that 50 percent flows into the ducts of each wing 5 to be discharged from outlets in the wings so that, as far as the discharge of air from the wings is concerned, the normal operational conditions are maintained although one of the compressors has failed, and no air stream is produced in main duct 3.

The automatic closing of the forward end of main duct 3 prevents a discharge of air flowing through transverse duct 12 into main duct 3 so that 50 percent of the air stream through main duct 2 is discharged from the left wing 5 which normally is supplied with 50 percent of the air stream flowing through main duct 3. The pressure of the air flowing through the transverse duct 12 acts on the spread flaps of control valve 9 to maintain the same in the duct closing position in which they are also held by spring 9a.

The discharge of air from discharge ducts 10 is terminated since no air flows through main duct 3, and since closure valve 6 closes the other discharge duct 10. However, the discharge of air from discharge ducts 10 is not absolutely necessary, whereas a symmetrical discharge of air from the wings is desired for maintaining a stable condition of the aircraft.

Referring now to FIG. 3 and 3a which show the wing construction in greater detail, it will be seen that the discharge ducts 40 and 41 are rearwardly directed and disposed adjacent the fuselage 1 at the inner ends of wings 5. Each wing 5 has a transverse duct portion 12a which is connected with outlet passages 12b terminating in narrow outlet slots 12c extending along the rear edge 51 of each wing. Turnable flaps 52 are provided along part of the rear edge of wings 5. The operation of control valves 7 and 9, closure valves 6 and 6a, and of linkages 70 and 90 is as described with reference to FIGS. 1 and 2.

This construction is best seen in the schematic perspective view of FIG. 4 which shows prismatic main ducts 20 and 30 and corresponding prismatic discharge ducts 100 and 100a. Control valve 7 is shown in duct closing position with two flaps 75 spread to close the respective main duct 20. The two flaps 75 are connected by pivot means 71 including a pivot pin secured to one flap 75 and turnably mounted in bearing members 72 secured to duct 20. The end of pivot pin 71 is secured to a lever arm 73 which is articulated to a link 70. The other end of link 70 is articulated to a lever arm 74 secured to a pivot pin 61 which is turnably mounted in bearing members 62 secured to the discharge duct 100a. Pivot pin 61 is secured to the valve flap 65.

The arrangement is such that when springs 76 urge the valve flaps 75 of control valve 7 to the spread duct closing position, lever arm 73 turns with pivot pin 71 and causes through linkage 70 turning of lever arm 74 with pin 61 and closure flap 65 so that discharge duct 100a is closed simultaneously with main duct 20.

In the operational condition shown in FIG. 4 the compressor producing an air stream in main duct 20 has failed so that the force of springs 76 is sufficient to spread flaps 75 and to close main duct 20.

The full force of the forward air stream in main duct 30 acts on valve flaps 95 of control valve 9, overcoming the force of the springs which tend to turn flaps 95 to the valve closing position. No part of the air stream in main duct 30 is discharged through discharge duct 100a, since closure valve 6a, and more particularly valve flap 65, has moved to the duct closing position illustrated in FIG. 4.

Flap 65 of the other closure valve in discharge duct 100 is held against the wall of discharge duct 100 so that discharge duct 100 is open. However, this is of no consequence since no air stream flows through main duct 20. Closure valve flap 65 is open, since the air pressure in main duct 30 has turned flaps 95 of control valve 9 to the folded open position. Lever arm 94 which is connected to the pivot pin of control valve 9, turns through linkage 90 lever arm 93 which is connected with valve flap 65 of the closure valve 6 in discharge duct 100.

It is also possible to operate the linkages 70 and 90 to shift the valves as above described, and therefore the linkages may be considered as operating means for control valves 7 and 9, and closure valves 6 and 6a.

Since springs 76 are responsive to the dynamic air pressure in main ducts 20 and 30, they may be considered as sensing means for sensing the air streams. It will be understood that such sensing means automatically control the function of the operating means.

The above described apparatus will permit the operation of an aircraft in a stable condition with discharge of air from both wings of the aircraft, even if one jet engine, or the compressor driven thereby, fails. Consequently, the required normal lifting force of the air discharged from the wings will be produced irrespective of whether both, or only one, jet propulsion units operate.

It will be understood that each of the elements described above, or two or more together, may also find a useful application in other types of air duct systems for jet aircraft differing from the types described above.

While the invention has been illustrated and described as embodied in a valve system for the air ducts of an aircraft having a plurality of jet engines and compressors driven by the same, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an aircraft having wings, in combination, first and second main duct means extending in longitudinal direction of the aircraft for guiding two forward streams of air toward a forward section of the aircraft; transverse duct means connecting said first and second main duct means and having outlet means located in the wings of the aircraft, respectively, for discharging air from the wings; first and second discharge duct means respectively connected to said main duct means for discharging parts of said two air streams so that the remaining parts of said air streams are discharged from said aircraft through said transverse duct means and said outlet means during normal operation of the aircraft; first and second control valve means respectively located in said forward ends of said first and second main duct means and being operable independently of each other between normal open positions and duct closing positions; first and second closure valve means respectively located in said first and second discharge duct means and being operable independently of each other between a normal open position and a duct closing position; and operating means for moving said first or second control valve means, respectively, and said second or first closure valve means, respectively, to said duct closing positions when one of said air streams in one of said main duct means ceases whereby the entire air stream in the respective other main duct means flows into said transverse duct means and is discharged from said outlet means in both wings of the aircraft while the respective closed control valve means prevents the flow of air from said transverse duct means into said one main duct means.

2. In an aircraft having wings, in combination, first and second main duct means extending in longitudinal direction of the aircraft for guiding two forward streams of air toward a forward section of the aircraft; transverse duct means connecting said first and second main duct means and having outlet means located in the wings of the aircraft, respectively, for discharging air from the wings; first and second discharge duct means respectively connected to said main duct means for discharging parts of said two air streams so that the remaining parts of said air streams are discharged from said aircraft through said transverse duct means and said outlet means during normal operation of the aircraft; first and second control valve means respectively located in said forward ends of said first and second main duct means and being operable independently of each other between normal open positions and duct closing positions; first and second closure valve means respectively located in said first and second discharge duct means and being operable independently of each other between a normal open position and a duct closing position; and operating means including linkage means connecting said first control valve means with said second closure valve means and said second control valve means with said first closure valve means, respectively, for moving said first or second control valve means, respectively, and said second or first closure valve means, respectively, to said duct closing positions when one of said air streams in one of said main duct means ceases whereby the entire air stream in the respective other main duct means flows into said transverse duct means and is discharged from said outlet means in both wings of the aircraft while the respective closed control valve means prevents the flow of air from said transverse duct means into said one main duct means.

3. In an aircraft having wings, in combination, first and second main duct means extending in longitudinal direction of the aircraft for guiding two forward streams of air toward a forward section of the aircraft; transverse duct means connecting said first and second main duct means and having outlet means located in the wings of the aircraft, respectively, for discharging air from the wings; first and second discharge duct means respectively connected to said main duct means for discharging parts of said two air streams so that the remaining parts of said air streams are discharged from said aircraft through said transverse duct means and said outlet means during normal operation of the aircraft; first and second control valve means respectively located in said forward ends of said first and second main duct means and being operable independently of each other between normal open positions and duct closing positions; first and second closure valve means respectively located in said first and second discharge duct means and being operable independently of each other between a normal open position and a duct closing position; first and second operating means for moving first or second control valve means, respectively, and said second or first closure valve means, respectively, to said duct closing positions when one of said air streams in one of said main duct means ceases whereby the entire air stream in the respective other main duct means flows into said transverse duct means and is discharged from said outlet means in both wings of the aircraft while the respective closed control valve means prevents the flow of air from said transverse duct means into said one main duct means; and first and second sensing means, respectively, located in said first and second main duct means for sensing said air streams, said sensing means being operatively connected to said operating means for actuating said first or second operating means, respectively, when the air streams in said first or second main duct means, respectively, cease.

4. In an aircraft having wings, in combination, first and second main duct means extending in longitudinal direction of the aircraft for guiding two forward streams of air toward a forward section of the aircraft; transverse duct means connecting said first and second main duct means and having outlet means located in the wings of the aircraft, respectively, for discharging air from the wings; first and second discharge duct means respectively connected to said main duct means for discharging parts of said two air streams so that the remaining parts of said air streams are discharged from said aircraft through said transverse duct means and said outlet means during normal operation of the aircraft; first and second control valve means respectively located in said forward ends of said first and second main duct means and being operable independently of each other between normal open positions and duct closing positions, each of said first and second control valve means being arranged and constructed to be held by said remaining part of the respective air stream in said open position; first and second resilient means operatively connected with the first and second control valve means for urging the same to said duct closing positions when the pressure of said air streams on said control valve means ceases; first and second closure valve means respectively located in said first and second discharge duct means and being operable independently of each other between a normal open position and a duct closing position; and operating means for moving said first or second control valve means, respectively, and said second or first closure valve means, respectively, to said duct closing positions when one of said air streams in one of said main duct means ceases whereby the entire air stream in the respective other main duct means flows into said transverse duct means and is discharged from said outlet means in both wings of the aircraft while the respective closed control valve means prevents the flow of air from said transverse duct means into said one main duct means.

5. In an aircraft having wings, in combination, first and second main duct means extending in longitudinal direction of the aircraft for guiding two forward streams of air toward a forward section of the aircraft; transverse duct means connecting said first and second main duct means and having outlet means located in the wings of the aircraft, respectively, for discharging air from the wings; first and second discharge duct means respectively connected to said main duct means for discharging parts of said two air streams so that the remaining parts of said air streams are discharged from said aircraft through said transverse duct means and said outlet means during normal operation of the aircraft; first and second control valve means respectively located in said forward ends of said first and second main duct means, each of said first and second control valve means including a pair of valve flaps, and pivot means located at the center of the respective main duct means and connecting said valve flaps for angular movement between a folded open position and a spread duct closing position; first and second spring means located between said valve flaps of said first and second control valve means, respectively, for urging said valve flaps to said spread duct closing position, said spring means being constructed and arranged so that the pressure of said remaining part of the air stream in the respective main duct means is sufficient to hold said control valve means in said folded open position whereas ceasing of one of asid air streams will cause movement of the respective valve flaps to said duct closing position; first and second closure valve means respectively located in said first and second discharge duct means and being operable independently of each other between a normal open position and a duct closing position; and operating means for moving said first or second control valve means, respectively, and said second or first closure valve means, respectively, to said duct closing positions when one of said air streams in one of said main duct means ceases whereby the entire air stream in the respective other main duct means flows into said transverse duct means and is discharged from said outlet means in both wings of the aircraft while the respective closed control valve means prevents the flow of air from said transverse duct means into said one main duct means.

6. In an aircraft having wings, in combination, first and second main duct means extending in longitudinal direction of the aircraft for guiding two forward streams of air toward a forward section of the aircraft; transverse duct means connecting the forward ends of said first and second main duct means and having outlet means located in the wings of the aircraft, respectively, for discharging air from the wings; first and second discharge duct means respectively connected to said main duct means rearwardly of said transverse duct means for discharging parts of said two air streams so that the remaining parts of said air streams are discharged from said aircraft through said transverse duct means and said outlet means during normal operation of the aircraft; first and second control valve means respectively located in said forward ends of said first and second main duct means between said transverse duct means and said discharge duct means and being operable independently of each other between normal open positions and duct closing positions; and operating means for moving said first or second control valve means, respectively, and said second or first closure valve means, respectively, to said duct closing positions when one of said air streams in one of said main duct means ceases whereby the entire air stream in the respective other main duct means flows into said transverse duct means and is discharged from said outlet means in both wings of the aircraft while the respective closed control valve means prevents the flow of air from said transverse duct means into said one main duct means.

7. In an aircraft having wings, in combination, first and second main duct means extending in longitudinal direction of the aircraft for guiding two forward streams of air toward a forward section of the aircraft; transverse duct means connecting said first and second main duct means and having outlet means located in the wings of the aircraft, respectively, for discharging air from the wings; first and second discharge duct means respectively connected to said main duct means for discharging parts of said two air streams so that the remaining parts of said air streams are discharged from said aircraft through said transverse duct means and said outlet means during normal operation of the aircraft; first and second control valve means respectively located in said forward ends of said first and second main duct means and being operable independently of each other between normal open positions and duct closing positions; first and second closure valve means respectively located in said first and second discharge duct means and being operable independently of each other between a normal open position and a duct closing position, each of said closure valve means including a valve flap and pivot means supporting said valve flap for angular movement between said positions; and operating means for moving said first or second control valve means, respectively, and said second or first closure valve means, respectively, to said duct closing positions when one of said air streams in one of said main duct means ceases whereby the entire air stream in the respective other main duct means flows into said transverse duct means and is discharged from said outlet means in both wings of the aircraft while the respective closed control valve means prevents the flow of air from said transverse duct means into said one main duct means.

8. In an aircraft having wings, in combination, first and second main duct means extending in longitudinal direction of the aircraft for guiding two forward streams of air toward a forward section of the aircraft; transverse duct means connecting said first and second main duct means and having outlet means located in the wings of the aircraft, respectively, for discharging air from the wings; first and second discharge duct means respectively connected to said main duct means for discharging parts of said two air streams so that the remaining parts of said air streams are discharged from said aircraft through said transverse duct means and said outlet means during normal operation of the aircraft; first and second control valve means respectively located in said forward ends of said first and second main duct means, each of said first and second control valve means including a pair of valve flaps, and pivot means located at the center of the respective main duct means and connecting said valve flaps for angular movement between a folded open position and a spread duct closing position; first and second spring means located between said valve flaps of said first and second control valve means, respectively, for urging said valve flaps to said spread duct closing position, said spring means being constructed and arranged so that the pressure of said remaining part of the air stream in the respective main duct means is sufficient to hold said control valve means in said folded open position whereas ceasing of one of said air streams will cause movement of the respective valve flaps to said duct closing position; first and second closure valve means respectively located in said first and second discharge duct means and being operable independently of each other between a normal open position and a duct closing position; each of said closure valve means including a valve flap and pivot means supporting said valve flap for angular movement between said positions including a first linkage connecting said valve flaps of said first control valve means with said valve flap of said second closure valve means for simultaneous turning movement, second linkage connecting said valve flaps of said second control valve means with said valve flap of said first closure valve means for moving said second and first closure valve means, respectively to said duct closing positions when one of said air streams in one of said main duct means ceases and said valve flaps of said first or second control valve means are moved by said first or second spring means to said duct closing position whereby the entire air stream in the respective other main duct means flows into said transverse duct means and is discharged from said outlet means in both wings of the aircraft while the respective closed control valve means prevents the flow of air from said transverse duct means into said one main duct means.

9. In an aircraft having wings, in combination, first and second main duct means extending in longitudinal direction of the aircraft for guiding two forward streams of air toward a forward section of the aircraft; transverse duct means connecting said first and second main duct means and having outlet means located in the wings of the aircraft, respectively, for discharging air from the wings; first and second discharge duct means respectively connected to said main duct means for discharging parts of said two air streams so that the remaining parts of said air streams are discharged from said aircraft through said transverse duct means and said outlet means during normal operation of the aircraft; first and second control valve means respectively located in said forward ends of said first and second main duct means and being operable independently of each other between normal open positions and duct closing positions; first and second closure valve means respectively located in said first and second discharge duct means and being operable independently of each other between a normal open position and a duct closing position; first and second operating means including linkage means connecting said first control valve means with said second closure valve means and said second control valve means with said first closure valve means, respectively, for moving said first or second control valve means, respectively, and said second or first closure valve means, respectively, to said duct closing positions when one of said air streams in one of said main duct means ceases whereby the entire air stream in the respective other main duct means flows into said transverse duct means and is discharged from said outlet means in both wings of the aircraft while the respective closed control valve means prevents the flow of air from said transverse duct means into said one main duct means.

10. In an aircraft having wings, in combination, first and second main duct means extending in longitudinal direction of the aircraft for guiding two forward streams of air toward a forward section of the aircraft; transverse duct means connecting said first and second main duct means and having outlet means located in the wings of the aircraft, respectively, for discharging air from the wings; first and second discharge duct means respectively connected to said main duct means for discharging parts of said two air streams so that the remaining parts of said air streams are discharged from said aircraft through said transverse duct means and said outlet means during normal operation of the aircraft; first and second control valve means respectively located in said forward ends of said first and second main duct means and being operable independently of each other between normal open positions and duct closing positions, each of said first and second control valve means being arranged and constructed to be held by said remaining part of the respective air stream in said open position; first and second resilient means operatively connected with the first and second control valve means for urging the same to said duct closing positions when the pressure of said air streams on said control valve means ceases; first and second closure valve means respectively located in said first and second discharge duct means and being operable independently of each other between a normal open position and a duct closing position; and operating means including linkage means connecting said first control valve means with said second closure valve means and said second control valve means with said first closure valve means, respectively, for moving said first or second control valve means, respectively, and said second or first closure valve means, respectively, to said duct closing positions when one of said air streams in one of said main duct means ceases whereby the entire air stream in the respective other main duct means flows into said transverse duct means and is discharged from said outlet means in both wings of the aircraft while the respective closed control valve means prevents the flow of air from said transverse duct means into said one main duct means.

11. In an aircraft having wings, in combination, first and second main duct means extending in longitudinal direction of the aircraft for guiding two forward streams of air toward a forward section of the aircraft; transverse duct means connecting the forward ends of said first and second main duct means and having outlet means located in the wings of the aircraft, respectively, for discharging air from the wings; first and second discharge duct means respectively connected to said main duct means rearwardly of said transverse duct means for discharging parts of said two air streams so that the remaining parts of said air streams are discharged from said aircraft through said transverse duct means and said outlet means during normal operation of the aircraft; first and second control valve means respectively located in said forward ends of said first and second main duct means between said transverse duct means and said discharge duct means and being operable independently of each other between normal open positions and duct closing positions, each of said first and second control valve means being arranged and constructed to be held by said remaining part of the respective air stream in said open position; first and second resilient means operatively connected with the first and second control valve means for urging the same to said duct closing positions when the pressure of said air streams on said control valve means ceases; first and second closure valve means respectively located in said first and second discharge duct means and being operable independently of each other between a normal open position and a duct closing position; and operating means including linkage means connecting said first control valve means with said second closure valve means and said control valve means with said first closure valve means, respectively, for moving said first or second control valve means, respectively, and said second or first closure valve means, respectively, to said duct closing positions when one of said air stream in one of said main duct means ceases whereby the entire air stream in the respective other main duct means flows into said transverse duct means and is discharged from said outlet means in both wings of the aircraft while the respective closed control valve means prevents the flow of air from said transverse duct means into said one main duct means.

12. In an aircraft having wings, in combination, first and second main duct means extending in longitudinal direction of the aircraft for guiding two forward streams of air toward a forward section of the aircraft; transverse duct means connecting the forward ends of said first and second main duct means and having outlet means located in the wings of the aircraft, respectively, for discharging air from the wings; first and second discharge duct means respectively connected to said main duct means rearwardly of said transverse duct means for discharging parts of said two air streams so that the remaining parts of said air streams are discharged from said aircraft through said transverse duct means and said outlet means during normal operation of the aircraft; first and second control valve means respectively located in said forward ends of said first and second main duct means between said transverse duct means and said discharge duct means, each of said first and second control valve means including a pair of valve flaps and pivot means located at the center of the respective main duct means and connecting said valve flaps for angular movement between a folded open position and a spread duct closing position; first and second spring means located between said valve flaps of said first and second control valve means, respectively, for urging said valve flaps to said spread duct closing position, said spring means being constructed and arranged so that the pressure of said remaining part of the air stream in the respective main duct means is sufficient to hold said control valve means in said folded open position whereas ceasing of one of said air streams will cause movement of the respective valve flaps to said duct closing position; first and second closure valve means respectively located in said first and second discharge duct means and being operable independently of each other between a normal open position and a duct closing position, each of said closure valve means including a valve flap and pivot means supporting said valve flap for angular movement between said positions; and operating means including a first linkage connecting said valve flaps of said first control valve means with said valve flap of said second closure valve means for simultaneous turning movement, a second linkage connecting said valve flaps of said second control valve means with said valve flap of said first closure valve means for moving said second and first closure valve means, respectively to said duct closing positions when one of said air streams in one of said main duct means ceases and said valve flaps of said first or second control valve means are moved by said first or second spring means to said duct closing position whereby the entire air stream in the respective other main duct means flows into said transverse duct means and is discharged from said outlet means in both wings of the aircraft while the respective closed control valve means prevents the flow of air from said transverse duct means into said one main duct means.

13. An apparatus as set forth in claim 12 wherein each of said linkages includes two lever arms respectively connected with said flaps of said control and closure valves, and a link connecting said lever arms and being articulated to the same.

14. An apparatus as set forth in claim 13 wherein one lever arm of each linkage is connected to one of said valve flaps of the respective control valve to turn the same through an angle of 90 degrees, and wherein the respective other lever arm of each linkage is connected to said valve flap of the respective closure valve to turn the same through an angle of 90 degrees.

15. In an aircraft having wings, in combination, first and second main duct means extending in longitudinal direction of the aircraft for guiding two forward streams of air toward a forward section of the aircraft; transverse duct means connecting said first and second main duct means and having outlet means located in the wings of the aircraft, respectively, for discharging air from the wing; first and second discharge duct means respectively connected to said main duct means for discharging parts of said two air streams so that the remaining parts of said air streams are discharged from said aircraft through said transverse duct means and said outlet means during normal operation of the aircraft; first and second control valve means respectively located in said forward ends of said first and second main duct means, each of said first and second control valve means including valve flap means and pivot means supporting said valve flap means for angular movement between an open position extending longitudinally of the respective main duct means and a transverse duct closing position; first and second spring means for urging said valve flap means to said transverse duct closing position, said spring means and valve flap means being constructed and arranged so that the pressure of said remaining part of the air stream in the respective main duct means is sufficient to hold said valve flap means in said longitudinal open position whereas ceasing of one of said air streams will cause movement of the respective flap means to said duct closing position; first and second closure valve means respectively located in said first and second discharge duct means and being operable independently of each other between a normal open position and a duct closing position; and operating means for moving said first and second control valve means, respectively, and said second or first closure valve means, respectively, to said duct closing positions when one of said air streams in one of said main duct means ceases whereby the entire air stream in the respective other main duct means flows into said transverse duct means and is discharged from said outlet means in both wings of the aircraft while the respective closed control valve means prevents the flow of air from said transverse duct means into said one main duct means.

16. In an aircraft having wings, in combination, first and second main duct means extending in longitudinal direction of the aircraft for guiding two forward streams of air toward a forward section of the aircraft; transverse duct means connecting said first and second main duct means and having outlet means located in the wings of the aircraft, respectively, for discharging air from the wings; first and second discharge duct means respectively connected to said main duct means for discharging parts of said two air streams so that the remaining parts of said air streams are discharged from said aircraft through said transverse duct means and said outlet means during normal operation of the aircraft; first and second control valve means respectively located in said forward ends of said first and second main duct means, each of said first and second control valve means including valve flap means and pivot means supporting said valve flap means for angular movement between an open position extending longitudinally of the respective main duct means and a transverse duct closing position; first and second spring means for urging said valve flap means to said transverse duct closing position, said spring means and valve flap means being constructed and arranged so that the pressure of said remaining part of the air stream in the respective main duct means is sufficient to hold said valve flap means in said longitudinal open position whereas ceasing of one of said air streams will cause movement of the respective flap means to said duct closing position; first and second closure valve means respectively located in said first and second discharge duct means and being operable independently of each other between a normal open position and a duct closing position, each of said closure valve means including a valve flap and pivot means supporting said valve flap for angular movement between said positions; and operating means including a first linkage connecting said valve flap means of said first control valve means with said valve flap of said second closure valve means for simultaneous turning movement, second linkage connecting said valve flap means of said second control valve means with said valve flap of said first closure valve means for moving said second and first closure valve means, respectively to said duct closing positions when one of said air streams in one of said main duct means ceases and said valve flap means of said first or second control valve means are moved by said first or second spring means to said duct closing position whereby the entire air stream in the respective other main duct means flows into said transverse duct means and is discharged from said outlet means in both wings of the aircraft while the respective closed control valve means prevents the flow of air from said transverse duct means into said one main duct means.

17. In an aircraft, in combination, first and second main duct means extending in longitudinal direction of the aircraft for guiding two forward streams of air toward a forward section of the aircraft; transverse duct means connecting said first and second main duct means and having outlet means for discharging air; discharge duct means connected to said main duct means for discharging air so that the remaining air is discharged from said aircraft through said transverse duct means and said outlet means during normal operation of the aircraft; first and second control valve means respectively located in said first and second main duct means and being operable independently of each other between normal open positions and duct closing positions; closure valve means located in said discharge duct means and being operable between a normal open position and a duct closing position; and operating means for moving said first or second control valve means, respectively, and said closure valve means to said duct closing positions when one of said air streams in one of said main duct means ceases whereby the entire air stream in the respective other main duct means flows into said transverse duct means and is discharged from said outlet means while the respective closed control valve means prevents the flow of air from said transverse duct means into said one main duct means.

18. In an aircraft, in combination, first and second main duct means extending in longitudinal direction of the aircraft for guiding two forward streams of air toward a forward section of the aircraft; transverse duct means connecting said first and second main duct means and having outlet means for discharging air; discharge duct means connected to said main duct means for discharging air so that the remaining air is discharged from said aircraft through said transverse duct means and said outlet means during normal operation of the aircraft; first and second control valve means respectively located in said first and second main duct means and being operable independently of each other between normal open positions and duct closing positions; resilient means for urging said first and second control valve means to said duct closing position, said resilient means and control valve means being arranged and constructed so that each control valve means is held by said remaining air of each air stream in said open position; closure valve means located in said discharge duct means and being operable between a normal open position and a duct closing position; and linkage means connecting said first and second control valve means with said closure valve means for moving the latter to said duct closing position when one of said control valve means moves to duct closing position when one of said air streams in one of said main duct means ceases whereby the entire air stream in the respective other main duct means flows into said transverse duct means and is discharged from said outlet means while the respective closed control valve means prevents the flow of air from said transverse duct means into said one main duct means.

References Cited in the file of this patent
UNITED STATES PATENTS

| | | |
|---|---|---|
| 2,912,189 | Pouit | Nov. 10, 1959 |
| 2,954,944 | Huet | Oct. 4, 1960 |
| 3,058,695 | Simonis | Oct. 16, 1962 |
| 3,068,647 | Santamaria | Dec. 18, 1962 |